(12) United States Patent
Bull et al.

(10) Patent No.: US 9,390,440 B2
(45) Date of Patent: Jul. 12, 2016

(54) ACTIVATION OF DIGITAL PRODUCTS ON MOBILE ELECTRONIC DEVICES

(75) Inventors: William E. Bull, Campbell, CA (US); Policarpo Wood, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 1321 days.

(21) Appl. No.: 12/167,114

(22) Filed: Jul. 2, 2008

(65) Prior Publication Data

US 2009/0187491 A1 Jul. 23, 2009

Related U.S. Application Data

(60) Provisional application No. 61/021,786, filed on Jan. 17, 2008.

(51) Int. Cl.
G06F 21/00 (2013.01)
G06Q 30/06 (2012.01)

(52) U.S. Cl.
CPC ............ G06Q 30/06 (2013.01); G06Q 30/0601 (2013.01)

(58) Field of Classification Search
CPC ....................................... G06F 21/00
USPC ......................................... 705/51
See application file for complete search history.

(56) References Cited

U.S. PATENT DOCUMENTS

| | | | |
|---|---|---|---|
| 8,151,259 B2 | 4/2012 | Fadell | |
| 2002/0144116 A1* | 10/2002 | Giobbi | G06F 21/10 |
| | | | 713/168 |
| 2002/0184515 A1* | 12/2002 | Oho | G06F 21/10 |
| | | | 713/193 |
| 2003/0079038 A1 | 4/2003 | Robbin et al. | |
| 2003/0167318 A1 | 9/2003 | Robbin et al. | |
| 2004/0059938 A1* | 3/2004 | Hughes | G06F 21/10 |
| | | | 726/26 |
| 2006/0100978 A1 | 5/2006 | Heller et al. | |
| 2006/0156239 A1 | 7/2006 | Jobs et al. | |
| 2006/0168351 A1 | 7/2006 | Ng et al. | |
| 2006/0197753 A1 | 9/2006 | Hotelling | |
| 2006/0200413 A1* | 9/2006 | Kessel | G06Q 30/02 |
| | | | 705/50 |
| 2009/0170058 A1* | 7/2009 | Walker | G09B 7/02 |
| | | | 434/323 |

FOREIGN PATENT DOCUMENTS

JP 2005327196 A * 11/2005 ............. G06F 21/00

* cited by examiner

*Primary Examiner* — James A Reagan
(74) *Attorney, Agent, or Firm* — Gazdzinski & Associates, PC

(57) ABSTRACT

Systems, methods and apparatus for distribution of digital products to portable electronic devices are disclosed. Digital products, such as digital assets or digital gifts, can be a purchased from a centralized location and associated with particular ones of the portable electronic devices. In one embodiment, the digital product is a digital asset (e.g., digital media asset) that is pre-stored to a portable electronic device, and after the digital asset is purchased, the digital asset can be activated on the portable electronic device. In another embodiment, the digital product is a digital gift that can be associated with a portable electronic device or a user account for a user of the portable electronic device. Optionally, a personalized message can be provided and associated with a portable electronic device.

19 Claims, 10 Drawing Sheets

ACTIVATION OF DIGITAL PRODUCTS ON MOBILE ELECTRONIC DEVICES

CROSS-REFERENCE TO RELATED APPLICATION

This application claims priority to U.S. Provisional Patent Application No. 61/021,786, filed Jan. 17, 2008, entitled "ACTIVATION OF DIGITAL PRODUCTS ON MOBILE ELECTRONIC DEVICES", which is herein incorporated by reference.

BACKGROUND OF THE INVENTION

Today, users of mobile electronic devices, such as digital media players or mobile phones, can often purchase digital media assets, such as songs, movies or ringtones. Once purchased, the songs, movies or ringtones need to be distributed to the mobile electronic devices. Although distribution could be by physical delivery of a compact disk (CD), digital versatile disk (DVD) or memory card, it is common for distribution to be electronic via a network (e.g., the Internet). Distribution of a digital media asset can conventionally be done by downloading a file for the digital media asset to the mobile electronic device. Once downloaded, the digital media asset is stored on the mobile electronic device and available for playback from the mobile electronic device. A digital rights management system can be used to restrict transferability or usage of the digital media assets to other electronic devices. Distribution of digital media assets can also conventionally be done by streaming digital data for a digital media asset to the mobile electronic device and playing the incoming digital data stream at the mobile electronic device. Unfortunately, however, digital media assets tend to be sizable and therefore consume significant network bandwidth and/or time to complete their electronic distribution.

In purchasing digital media assets, a user can make use of a pre-paid gift card that represents a cash value for use at a particular online or physical (brick-and-mortar) store. For example, with an online media store, the gift card can be redeemed for store credit which can then be used to purchase digital media assets. Conventional gift cards are thus not associated with particular electronic devices. As a result, it can be burdensome and time consuming for users to use gift cards to provide digital media assets onto particular electronic devices. Also, gift givers are not able to ensure that the gift cards are used to provide digital media assets to particular electronic devices.

SUMMARY OF THE INVENTION

The invention pertains to systems, methods and apparatus for distribution of digital products to portable electronic devices. Digital products, such as digital assets or digital gifts, can be a purchased from a centralized location and associated with particular ones of the portable electronic devices. In one embodiment, the digital product is a digital asset (e.g., digital media asset) that is pre-stored to a portable electronic device, and after the digital asset is purchased, the digital asset can be activated on the portable electronic device. In another embodiment, the digital product is a digital gift that can be associated with a portable electronic device or a user account for a user of the portable electronic device. Optionally, a personalized message can be provided and associated with a portable electronic device.

The invention can be implemented in numerous ways, including as a method, system, device, or apparatus (including graphical user interface and computer readable medium). Several embodiments of the invention are discussed below.

As a method for activating digital assets pre-stored on a portable electronic device, one embodiment of the invention can, for example, include at least the acts of: receiving an indication of one or more digital assets pre-stored on a portable electronic device that are to be purchased; processing purchase of the portable electronic device and the one or more pre-stored digital assets; and initiating transmission of activation information for the one or more pre-stored digital assets to a remote activation manager.

As a digital asset purchase and activation system for portable electronic devices, one embodiment of the invention can, for example, include at least: a store configured to operatively connect to a network, said store offering for purchase (i) portable electronic devices having one or more pre-stored digital assets stored thereon, and/or (ii) the one or more pre-stored digital assets stored on the portable electronic devices; and an activation manager configured to operatively connect to the network, said activation manager operates to manage activation of certain pre-stored digital assets that have been purchased.

As a method for activating a digital asset pre-stored on a portable electronic device, one embodiment of the invention can, for example, include at least the acts of: retrieving a device identifier from the portable electronic device; sending the device identifier to a remote activation manager; determining whether an activation code is received from the remote activation manager in response to said sending of the device identifier to the remote activation manager; and activating one or more digital assets that are pre-stored on the portable electronic device in accordance with the activation code.

As a method for activating a digital gift associated with a portable electronic device, one embodiment of the invention can, for example, include at least the acts of: receiving an indication of a digital gift to be associated with a portable electronic device that is to be purchased; processing purchase of the portable electronic device and the digital gift; and initiating transmission of activation information for the digital gift to an activation manager.

As a computer readable medium including at least executable computer program code tangibly stored thereon for activating a digital product associated with a portable electronic device, one embodiment of the invention can, for example, include at least: computer program code for receiving an indication of a digital product to be associated with a portable electronic device that is to be purchased; computer program code for processing purchase of the portable electronic device and the digital product; and computer program code for initiating transmission of activation information for the digital product to an activation manager.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to systems, methods and apparatus for distribution of digital products to portable electronic devices. Digital products, such as digital assets or digital gifts, can be a purchased from a centralized location and associated with particular ones of the portable electronic devices. In one embodiment, the digital product is a digital asset (e.g., digital media asset) that is pre-stored to a portable electronic device, and after the digital asset is purchased, the digital asset can be activated on the portable electronic device. In another embodiment, the digital product is a digital gift that can be associated with a portable electronic device or a user account for a user of the portable electronic device. Optionally, a personalized message can be provided and associated with a portable electronic device.

Embodiments of the invention are discussed below with reference to FIGS. 1-10. However, those skilled in the art will readily appreciate that the detailed description given herein with respect to these figures is for explanatory purposes as the invention extends beyond these limited embodiments.

Figure 1:
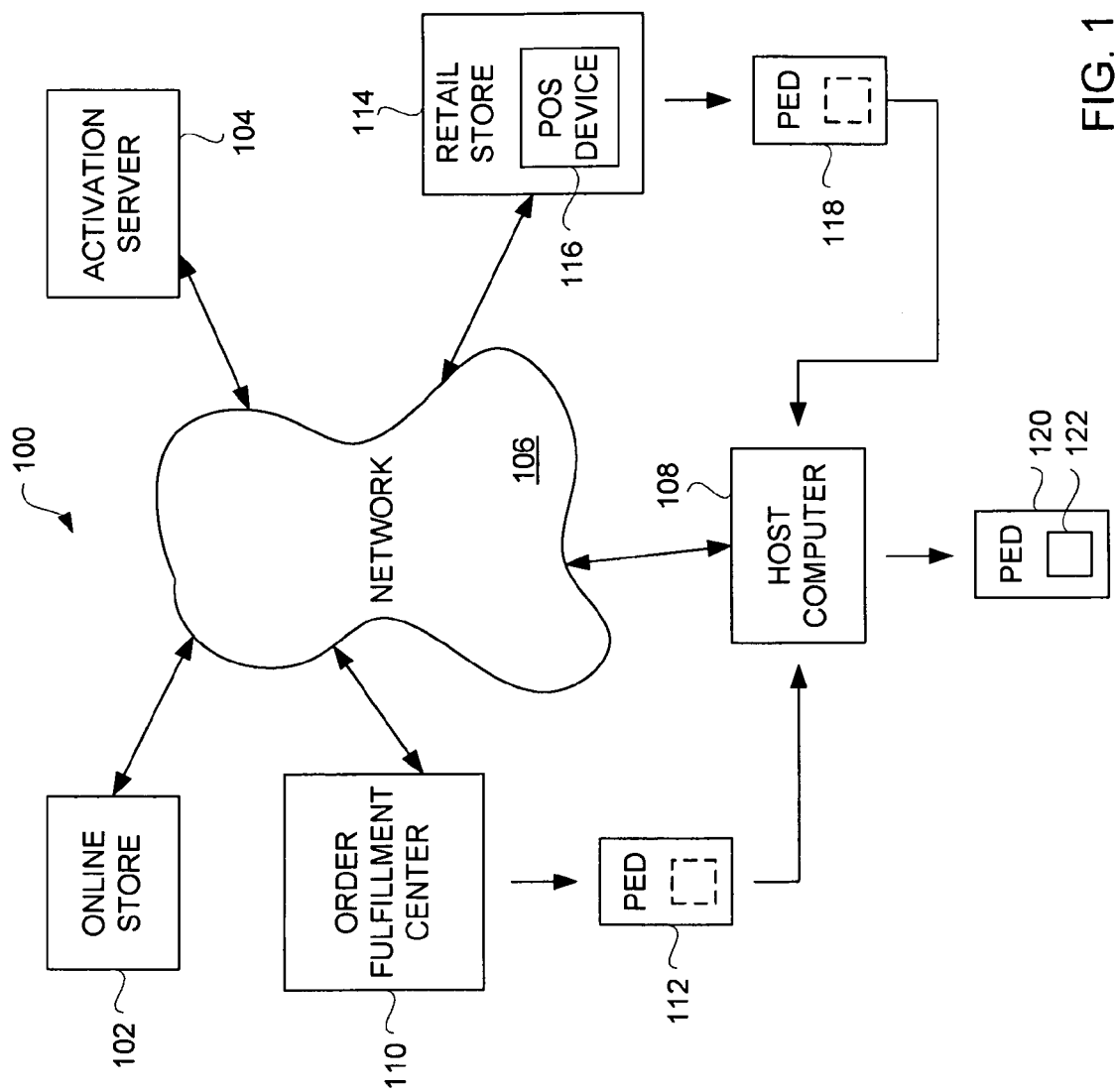
FIG. 1 is a block diagram of a digital asset activation system according to one embodiment of the invention.

FIG. 1 is a block diagram of a digital asset activation system 100 according to one embodiment of the invention. The digital asset activation system 100 provides a system to activate digital assets with respect to portable electronic devices.

The digital asset activation system 100 includes an online store 102. The online store 702 supports browsing, searching and purchasing of digital assets. A user (or purchaser) of the online store 102 can purchase digital assets from the online store 102. In one embodiment, the digital assets being purchased from the online store 102 can be affiliated with a portable electronic device (PED) also being purchased from the online store 102. More particularly, the portable electronic device being purchased can be one of a plurality of portable electronic devices that are generally produced such that they include pre-stored digital assets in a secure manner. When one or more of the pre-stored digital assets on the portable electronic device are purchased from the online store 102, the digital asset activation system 100 can operate to cause the secured digital assets that are pre-stored on the portable electronic device to be selectively activated. In one embodiment, the secured digital assets are "locked" by cryptographic techniques and the activation process can serve to provide one or more cryptographic keys to "unlock" the secured digital assets.

The one or more digital assets being purchased from the online store 102 are already stored on the portable electronic device and, therefore, can be activated on the portable electronic device, thereby avoiding the need for downloading of the one or more digital assets to the portable electronic device. More particularly, when the purchaser operates to purchase the one or more digital assets from the online store 102, activation information can be sent by the online store 102 to an activation server 104. The activation information can, for example, be sent to the activation server 104 via a network 106. Subsequently, a host computer 108 can activate the one or more digital assets that have been purchased.

The digital asset activation system 100 can permit purchase of portable electronic devices as well as pre-stored digital assets using the online store 102. In such case, an order for a portable electronic device and one or more digital assets can be fulfilled by an order fulfillment center 110. In one embodiment, the online store 102 communicates the order to the order fulfillment center 110 via the network 106. The online fulfillment center 110 can operate it to ship or deliver a portable electronic device 112 having pre-stored digital assets to the host computer 108. Here, the pre-stored digital assets stored on the portable electronic device 112 are "locked" (or deactivated). However, to the extent that one or more of the digital assets that are pre-stored on the portable electronic device 112 have been purchased, those of the pre-stored digital media assets that have been purchased can be selectively activated.

To activate those of the pre-stored digital media assets that have been purchased, the host computer 108 can interact with the activation server 104 over the network 106. For example, the host computer 108 can provide device information to the activation server 104. The device information, for example, can be a unique device identifier, such as a serial number for the portable electronic device. The activation server 104 can examine the device information as well as activation information previously provided when purchased to determine whether and what digital assets that are pre-stored on the portable electronic device 112 are to be activated. When one or more of the pre-stored digital assets are to be activated, the activation server 104 can provide activation instructions to the host computer 108. The host computer 108 can then operate in accordance with the activation instructions to selectively activate the one or more pre-stored digital assets that have been purchased, such that the portable electronic device 112 thereafter has the ability to utilize those more or more digital assets that have been purchased.

Alternatively, a purchaser can visit a retail store 114 (or retail location) to purchase one or more digital assets that are pre-stored on portable electronic devices. The retail store 114 can include a point of sale (POS) device 116. A user can physically browse the retail store 114 to locate a portable electronic device 118 they desire to purchase. The purchaser can then purchase the portable electronic device 118 at the POS device 116. At the same time, the purchaser can also purchase one or more digital assets that have been previously pre-stored on the portable electronic device 118 being purchased.

Accordingly, the digital asset activation system 100 enables a portable electronic device to be purchased either online or at a retail store. When the portable electronic device 118 has been purchased from the retail store 114, the retail store 114 (or the POS device 116) can operate it to provide activation information to the activation server 104. Thereafter, when the portable electronic device 118 is connected to the host computer 108, the host computer 108 can operate to send device information (e.g., device identifier) to the activation server 104. The activation server 104 can then determine (based on activation information and device information) whether one or more digital assets pre-stored on the portable electronic device 118 are to be activated. When one or more of the digital assets are to be activated, the activation server 104 sends activation instructions to the host computer 108. Thereafter, the host computer 108 can interact with the portable electronic device 118 in accordance with the activation instructions to "unlock" or activate a portion of the pre-stored digital assets that corresponds to the one or more digital assets that have been purchased by the purchaser.

A resulting portable electronic device 120 is illustrated in FIG. 1 as having active pre-stored digital assets 122 available for use. Accordingly, in this embodiment, the host computer 108 together with the activation server 104 has operated to subsequently "unlock" or activate some portion of secured pre-stored digital assets on the portable electronic device 120. Consequently, the resulting portable electronic device 120 includes the active pre-stored digital assets 122 that can be utilized by the portable electronic device 120.

In another embodiment, pre-stored digital assets on a portable electronic device can be provided more directly by the order fulfillment center 110 or the retail store 114. For example, the order fulfillment center 110 can operate to directly activate some portion of the digital assets pre-stored on the portable electronic device. As another example, the retail store 114 can also directly activate some portion of the pre-stored digital assets. For example, the POS device 116, can directly interact with the portable electronic device to activate some portion of the pre-stored digital assets. In one instance, a portable electronic device being purchased at the retail store 114 can be coupled to the POS device 116 in a wired (e.g., cable or dock) or wireless (e.g., RFID or Bluetooth) manner. The POS device 116 can then operate to activate some portion of the pre-stored digital assets on the portable electronic device being purchased.

Figure 2:
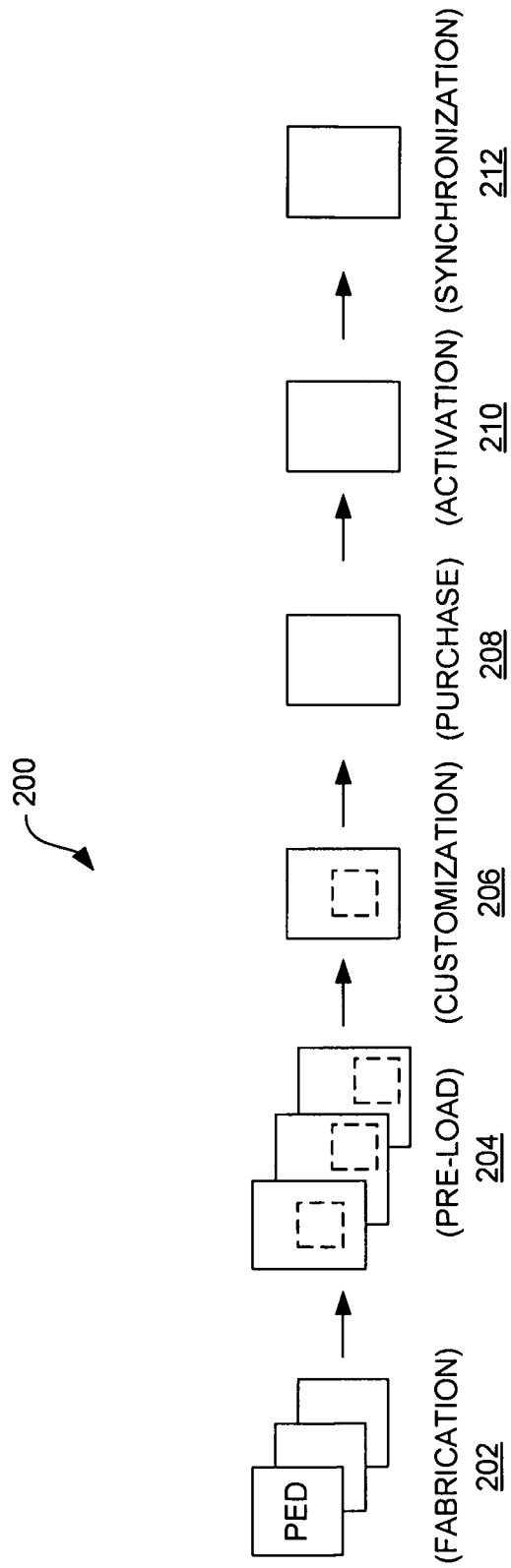
FIG. 2 is an activation state diagram according to one embodiment of the invention.

FIG. 2 is an activation state diagram 200 according to one embodiment of the invention. The activation state diagram 200 illustrates a plurality of different states that can be associated with digital asset activation on a portable electronic device.

The activation state diagram 200 can begin with a fabrication state 202. At the fabrication state 202, a plurality of portable electronic devices can be fabricated. Fabrication can include manufacture and/or assembly of the portable electronic devices. Following the fabrication state 202, a pre-load state 204 can be performed. At the pre-load state 204, each of the fabricated portable electronic devices can be loaded with secured digital assets. In one embodiment, the secured digital assets can be secured using cryptographic techniques. The secured digital assets are digital assets that are currently secured such that they are effectively not usable on the portable electronic devices until they are unsecured.

Next, at a customization state 206, a purchaser of a portable electronic device, such as one of the portable electronic devices resulting from the pre-load state 204, can request activation of a selected portion of the secured digital assets that are pre-loaded on the portable electronic device. Typically, those portions of the secured digital assets that the purchaser has selected are first required to be purchased. Hence, a purchase state 208 can be provided to enable the purchaser to purchase not only the portable electronic device but also the selected portion of the secure digital assets pre-stored on the portable electronic device. In one embodiment, the purchase can be completed, for example, using an electronic payment transaction. Following the purchase state 208, an activation state 210 can be performed. The activation state 210 can operate to activate the selected portion of the secured digital assets that have been purchased by the purchaser. Thereafter, a synchronization state 212 can be performed. At the synchronization state 212, the portable electronic device can interact with a host device to exchange digital assets either from the host device to the portable electronic device or from the portable electronic device to the host device, or both.

In one embodiment, synchronization provided at the synchronization state 212 can be performed such that certain digital assets residing on a portable electronic device would not be synchronized with a host device. For example, personal messages (discussed below), art work, and pre-stored items can be exempted from synchronization (and therefore not be copied to the host device).

Figure 3:
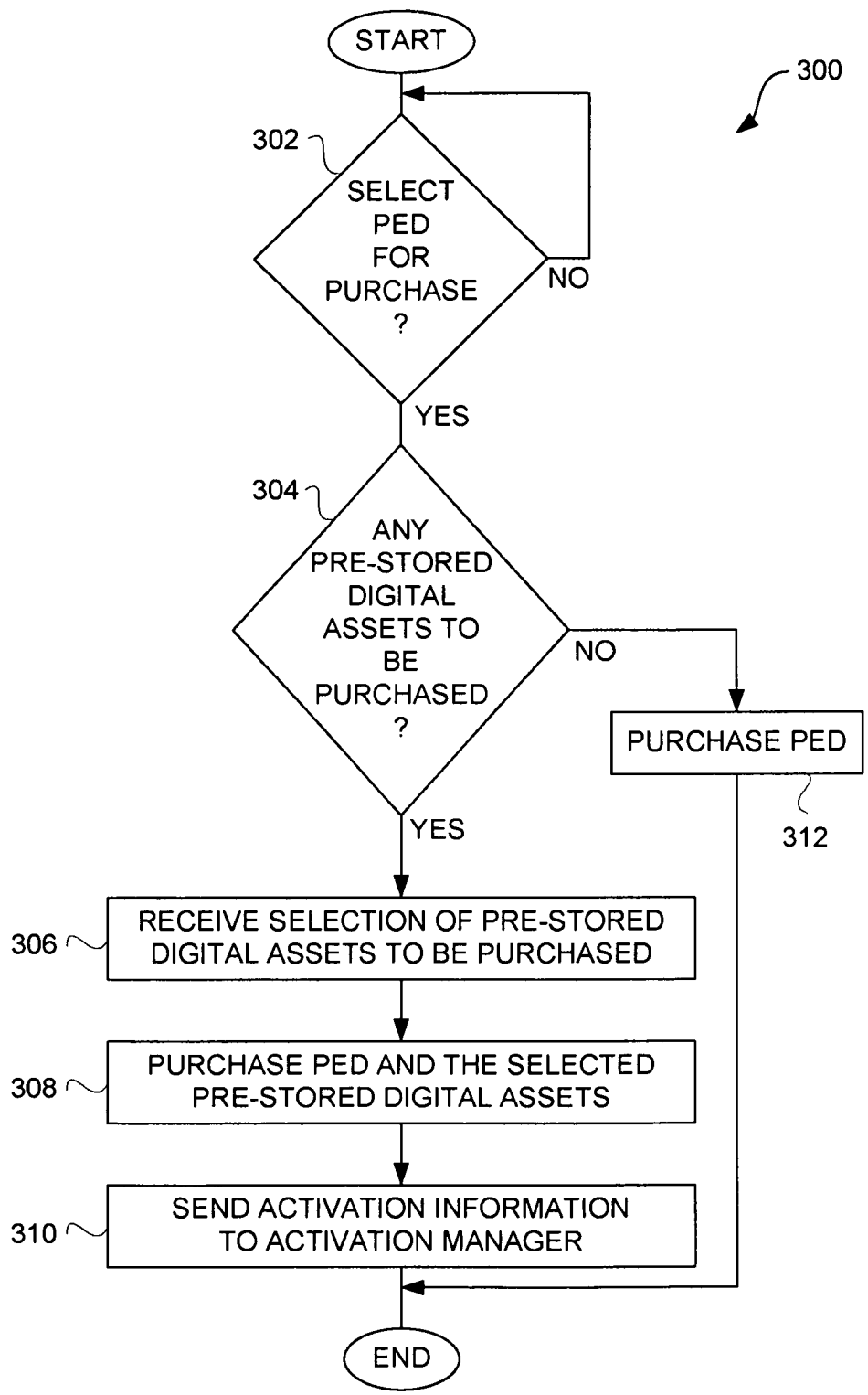
FIG. 3 is a flow diagram of a purchase process according to one embodiment of the invention.

FIG. 3 is a flow diagram of a purchase process 300 according to one embodiment of the invention. The purchase process 300, for example, can be performed by an online commerce system (e.g., online store 102) or a physical retail location (e.g., retail store 114).

The purchase process 300 can begin with a decision 302 that determines whether a portable electronic device has been selected for purchase. When the decision 302 determines that a portable electronic device has not yet been selected for purchase, the purchase process 300 can await such a selection. On the other hand, when the decision 302 determines that a portable electronic device has been selected for purchase, a decision 304 can determine whether any pre-stored digital assets on the portable electronic device are to be purchased. When the decision 304 at determines that there are pre-stored digital assets on the portable electronic device that are to be purchased, a selection of pre-stored digital assets to be purchased can be received 306. Next, the portable electronic device and the selected pre-stored digital assets can be purchased 308. In addition, activation information can be sent 310 to an activation manager. In one embodiment, the activation information can include a unique device identifier for the portable electronic device as well as unique identifiers for the pre-stored digital assets that have been purchased.

The activation manager, for example, is a remote program, module, process or system that operates to manage subsequent activation of portable electronic devices. As an example, the activation manager can be implemented at a remote activation server, such as the activation server 104 illustrated in FIG. 1. As one example, the activation information can be sent 310, namely, electronically sent, to the activation manager by a point-of-sale device at a retail location. As another example, the activation information can be sent 310, namely, electronically sent, to the activation manager by an e-commerce server or an order fulfillment center. Following the block 310, the purchase process 300 can end.

On the other hand, when the decision 304 determines that there are no pre-stored digital assets being purchased, the portable electronic device can be purchased 312. Here, the portable electronic device can still be purchased 312 even though no pre-stored digital assets are being purchased. Following the block 312, the purchase process 300 can end.

Figure 4:
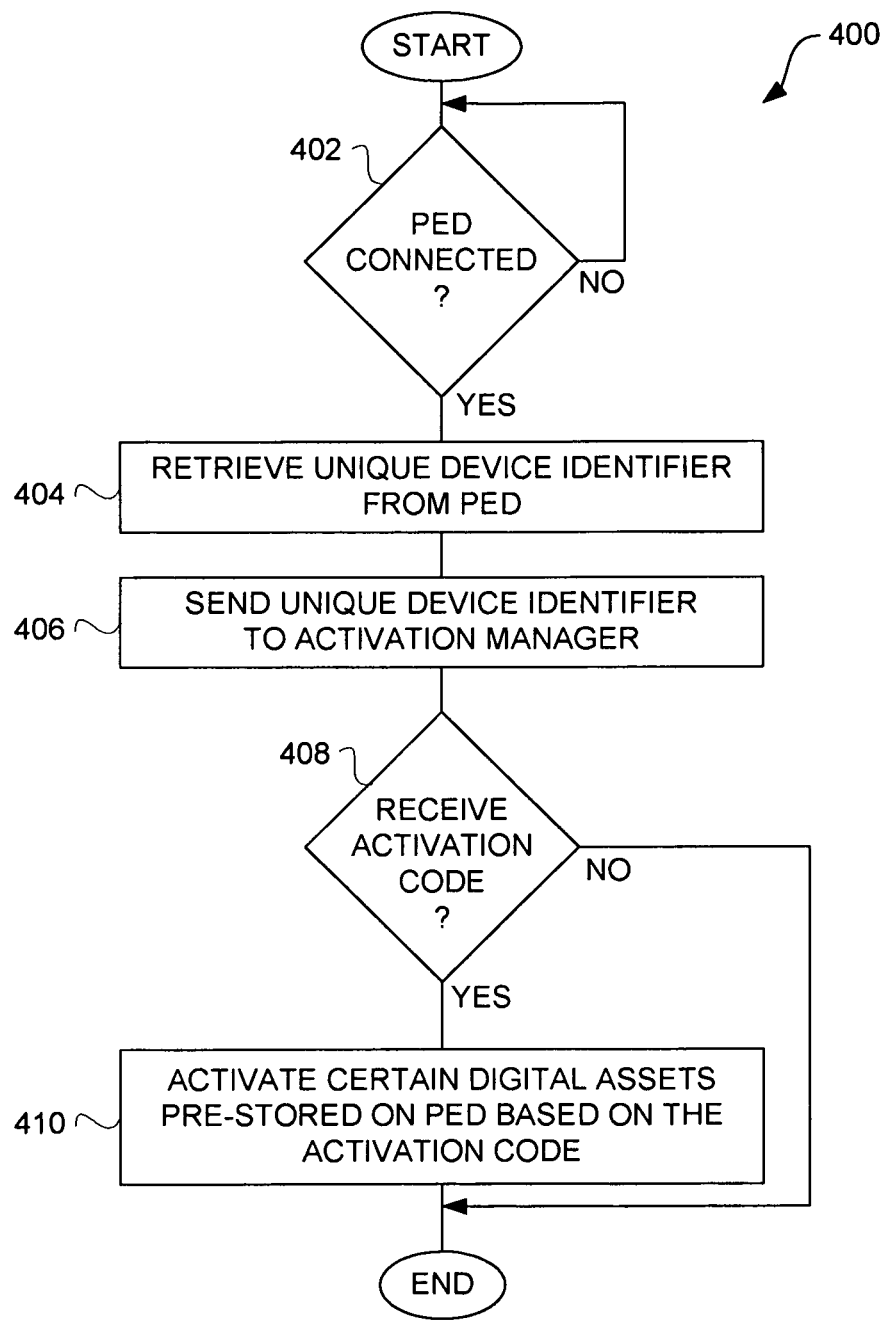
FIG. 4 is a flow diagram of a digital asset activation process according to one embodiment of the invention.

FIG. 4 is a flow diagram of a digital asset activation process 400 according to one embodiment of the invention. The digital asset activation process 400 is, for example, performed by a host computer, such as the host computer 108 illustrated in FIG. 1.

The digital asset activation process 400 can begin with a decision 402 that determines whether any portable electronic device is connected to the host computer. When the decision 402 determines that a portable electronic device is not presently connected to the host computer, the digital asset activation process 400 can await such a connection. In other words, the digital asset activation process 400 can be performed (or invoked) when a portable electronic device is connected to the host computer.

Once the decision 402 determines that a portable electronic device is connected to the host computer, a unique device identifier is retrieved from the portable electronic device. As an example, the unique device identifier can be a serial number assigned to the portable electronic device. Next, the unique device identifier is sent 406 to an activation manager. As noted above, the activation manager can manage activation of purchased digital assets on the portable electronic device. Next, a decision 408 determines whether an activation code has been received from the activation manager. In one embodiment, the activation manager can respond to the unique device identifier with an activation code. Here, if the activation manager determines that certain pre-stored digital assets on the portable electronic device have been purchased and therefore are to be activated, the activation code can be supplied by the activation manager to the portable electronic device. Hence, when the decision 408 determines that an activation code has been received, certain digital assets pre-stored on the portable electronic device can be activated 410 based on the activation code. In other words, since the pre-stored digital assets are stored in a secure manner on the portable electronic device, they must be activated or unlocked in order to be utilized. Hence, the activation code provided by the activation manager can be utilized to activate or unlock the certain digital assets that are pre-stored on the portable electronic device. Alternatively, when the decision 408 determines that an activation code is not received from the activation manager, then the block 410 can be bypassed such that none of the pre-stored digital assets are activated. Following the block 410 or bypass of the block 410, the digital asset activation process 400 can end.

According to another aspect of the invention, a portable electronic device can be personalized for its recipient. The recipient can, for example, be the purchaser or a person receiving the portable electronic device as a gift. In one embodiment, the personalization pertains to providing a personalized message to be associated with the portable electronic device. The personalized message can include a text, audio and/or video message.

Figure 5:
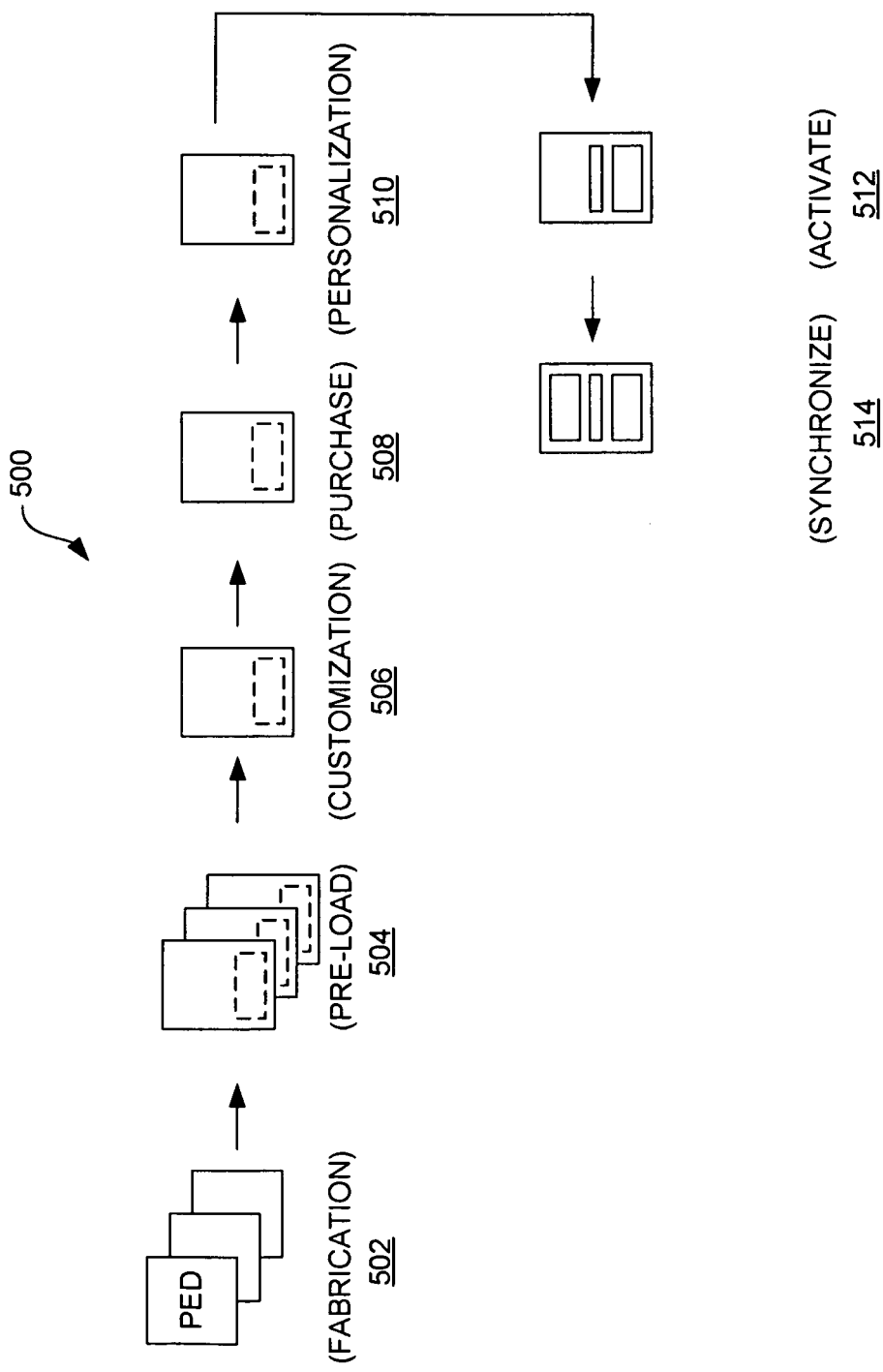
FIG. 5 is an activation state diagram according to another embodiment of the invention.

FIG. 5 is an activation state diagram 500 according to another embodiment of the invention. The activation state diagram 500 illustrates a plurality of different states that can be associated with activation of digital assets on a portable electronic device and/or personalization of the portable electronic device.

The activation state diagram 500 can begin with a fabrication state 502. At the fabrication state 502, a plurality of portable electronic devices can be fabricated. Fabrication can include manufacture and/or assembly of the portable electronic devices. Following the fabrication state 502, a pre-load state 504 can be performed. At the pre-load state 504, each of the fabricated portable electronic devices can be loaded with secured digital assets. In one embodiment, the secured digital assets can be secured using cryptographic techniques. The secured digital assets are digital assets that are currently secured such that they are effectively not usable on the portable electronic devices until they are unsecured.

Next, at a customization state 506, a purchaser of a portable electronic device, such as one of the portable electronic devices resulting from the pre-load state 504, can be customized to request activation of a selected portion of the secured digital assets that are pre-loaded on the portable electronic device. Typically, those portions of the secured digital assets that the purchaser has selected are first required to be purchased. Hence, a purchase state 508 can be provided to enable the purchaser to purchase not only the portable electronic device but also the selected portion of the secure digital assets pre-stored on the portable electronic device. In one embodiment, the purchase can be completed, for example, using an electronic payment transaction.

Following the purchase state 508, a personalize state 510 can be performed. The personalize state 510 can permit the purchaser to personalize the portable electronic device being purchased. In one implementation, the purchaser can personalize the portable electronic device by providing a personal message to be store on the portable electronic device. The personal message is typically a digital message. The personal message can include text, audio and/or video. Hence, the purchaser can record any personal message they desire and have it stored on the portable electronic device.

After the personalize state 510, an activation state 512 can be performed. The activation state 512 can operate to activate the selected portion of the secured digital assets that have been purchased by the purchaser. Thereafter, a synchronization state 514 can be performed. At the synchronization state 514, the portable electronic device can interact with a host device to exchange digital assets either from the host device to the portable electronic device or from the portable electronic device to the host device, or both.

In one embodiment, synchronization provided at the synchronization state 514 can be performed such that certain digital assets residing on a portable electronic device would not be synchronized with a host device. For example, personal messages (discussed below), art work, and pre-stored items can be exempted from synchronization (and therefore not be copied to the host device).

Figure 6:
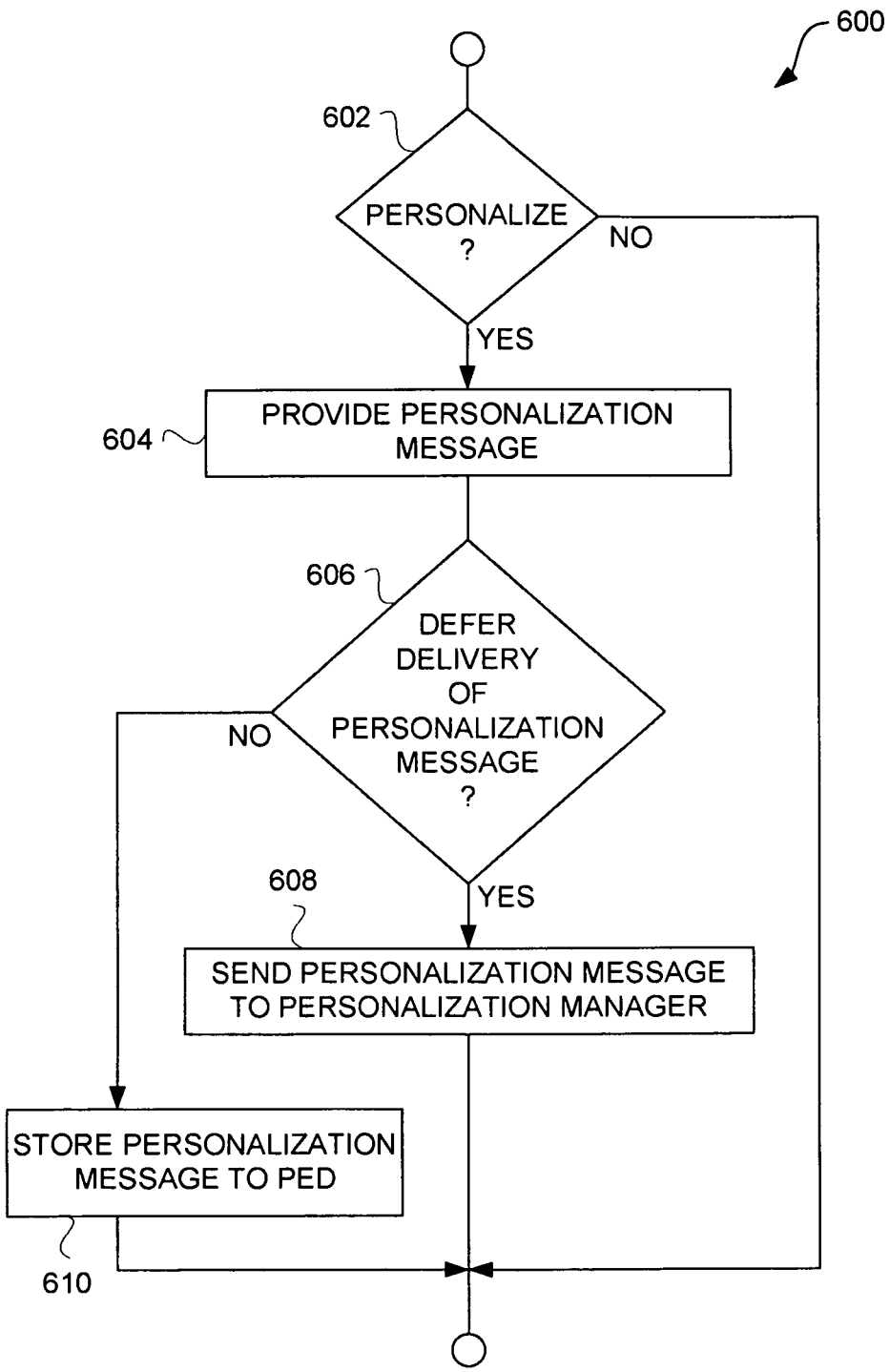
FIG. 6 is a flow diagram of a personalization process according to one embodiment of the invention.

FIG. 6 is a flow diagram of a personalization process 600 according to one embodiment of the invention. The personalization process 600 can, for example, be performed by an online commerce system, an order fulfillment server, or a physical retail location. The personalization process 600 can be performed in conjunction with any part of the purchase process 300 following the decision 302 illustrated in FIG. 3. The personalization process 600 can also be performed in conjunction with any part of a digital gift process 800 following a decision 802 illustrated in FIG. 8 discussed below.

The personalization process 600 can begin with a decision 602 that determines whether a portable electronic device, such as a portable electronic device being purchased, is to be personalized. When the decision 602 determines that the portable electronic device is to be personalized, a personalization message can be provided 604. Here, a purchaser can provide the personalization message by entering appropriate text and/or by recording an audio and/or video message.

Next, a decision 606 can determine whether the delivery of the personalization message is to be deferred. When the decision 606 determines that delivery of the personalization message is to be deferred, the personalization message can be sent 608 to a personalization manager. The personalization message can, for example, be associated with a unique device identifier associated with the portable electronic device. A personalization manager is an application, process, module or system that is performed by a computing device, such as the online store 102 or the activation server 104 illustrated in FIG. 1.

On the other hand, when the decision 606 determines that delivery of the personalization message is not to be deferred, the personalization message can be stored 610 on the portable electronic device. In one embodiment, the personalization message can be stored 610 on the portable electronic device by the online store 102 or the order fulfillment center 110 illustrated in FIG. 1. In another embodiment, when the portable electronic device and the personalization message are being provided at a retail location, such as the retail store 114, the personalization message can be stored to the portable electronic device at the retail store 114.

Following the blocks 608 and 610, the personalization process 600 can end. Also, following the decision 602 when the portable electronic device is not being personalized, the blocks 604-610 can be bypassed and the personalization process 600 can end without performing any personalization.

According to another aspect of the invention, a purchaser can gift digital assets to a recipient having a portable electronic device. In one embodiment, the purchaser purchases the portable electronic device and also purchases a digital gift to be utilized with the portable electronic device.

Figure 7:
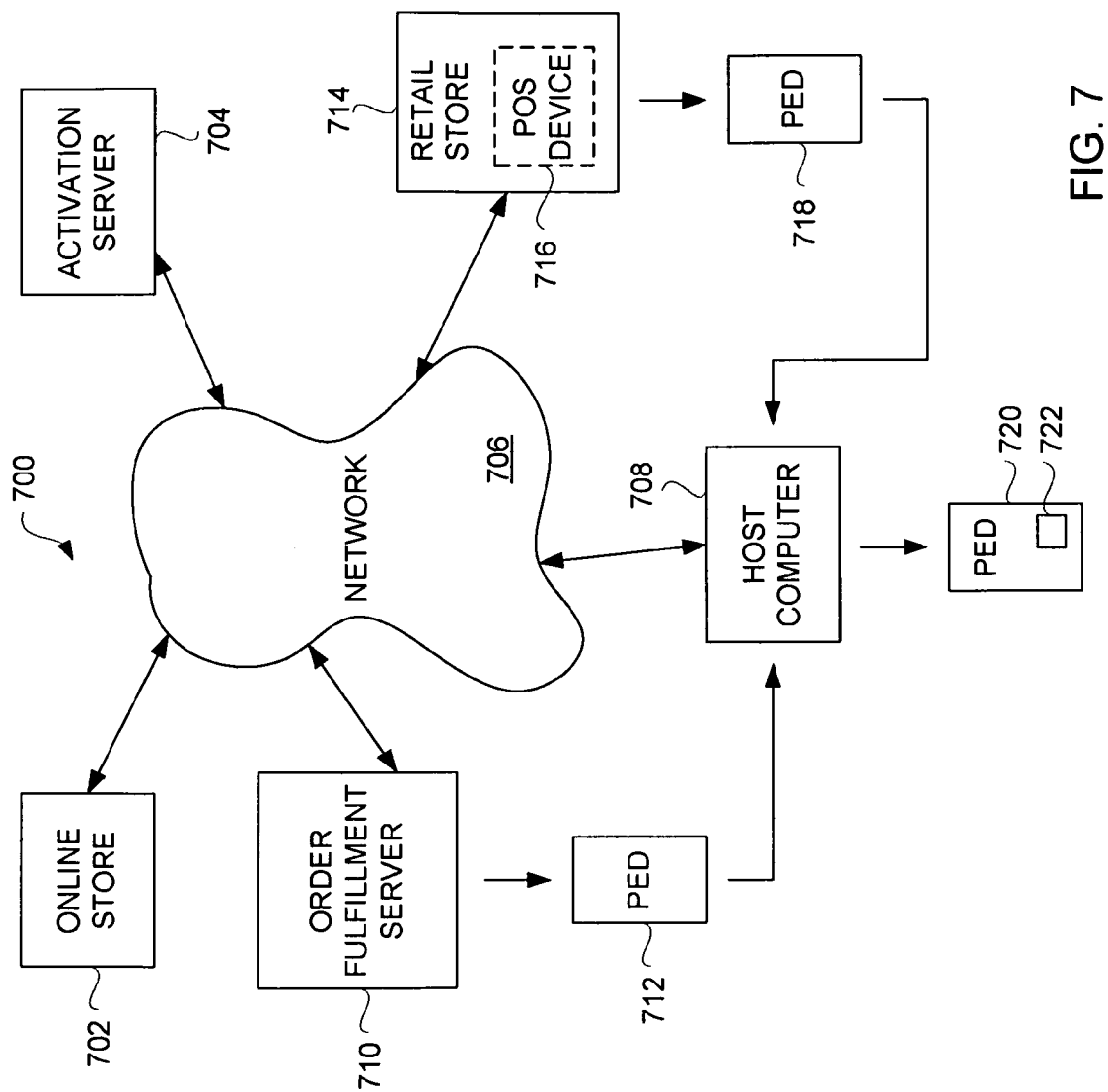
FIG. 7 is a block diagram of a digital gift activation system according to one embodiment of the invention.

FIG. 7 is a block diagram of a digital asset activation system 700 according to one embodiment of the invention. The digital asset activation system 700 provides a system to activate digital gifts with respect to portable electronic devices.

The digital asset activation system 700 includes an online store 702. The online store 702 permits users of the online store 702 to browse, search and purchase digital assets. A user (or purchaser) of the online store 702 can purchase digital gifts from the online store 702. The digital gift can be a general gift or a specific gift. As one example, a general gift can be an amount of store credit. As one example, a specific gift can be a set of digital assets associated with a classification, such as a genre classification or a rating classification. In one embodiment, the digital gifts being purchased from the online store 702 can be affiliated with a portable electronic device (PED), such as a portable electronic device also being purchased from the online store 702.

The digital gift being purchased from the online store 702 can be associated with the portable electronic device. After being purchased, the digital gift can be activated on the portable electronic device, thereby avoiding the need for a separate gift card. More particularly, when the purchaser operates to purchase the digital gift from the online store 702, activation information can be sent by the online store 702 to an activation server 704. The activation information can, for example, be sent to the activation server 704 via a network 706. Subsequently, the purchaser can utilize a host computer 708 to activate the digital gift that has been purchased. The digital gift can be associated with a specific one or more digital assets (e.g., digital media assets). As an example, the digital gift can be associated with a particular set of digital assets. In one implementation, on purchase of the gift card, the purchaser can associate the gift card with a particular one of a plurality of available sets of digital assets.

The digital asset activation system 700 can permit purchase of portable electronic devices as well as digital gifts using the online store 702. In such case, an order for a portable electronic device and a digital gift can be fulfilled by an order fulfillment center 710. In one embodiment, the online store 702 communicates the order to the order fulfillment center 710 via the network 706. The online fulfillment center 710 can operate it to ship or deliver a portable electronic device 712. Optionally, the portable electronic device 712 can have pre-stored digital assets as discussed above. Here, the pre-stored digital assets stored on the portable electronic device 712 are "locked" (or deactivated).

To activate the digital gift that has been purchased, the host computer 708 can interact with the activation server 704 over the network 706. For example, the host computer 708 can provide device information to the host server 704. The device information, for example, can be a unique device identifier, such as a serial number for the portable electronic device. The activation server 704 can examine the device information as well as activation information previously provided during a purchase to determine whether and what digital gift is to be activated. When a digital gift is to be activated, the activation server 704 can provide activation instructions to the host computer 708. The host computer 708 can then operate to selectively activate the digital gift that has been purchased, such that the portable electronic device 712 thereafter has the ability to utilize the digital gift, e.g., to purchase one or more digital assets that have been purchased.

Alternatively, a purchaser can visit a retail store 714 (or retail location) to purchase a digital gift. The retail store 714 can include a point of sale (POS) device 716. A user can physically browse the retail store 714 to locate a portable electronic device 718 they desire to purchase. The purchaser can then purchase the portable electronic device 718 at the POS device 716. At the same time, the purchaser can also purchase a digital gift (and possible also one or more pre-stored digital assets as discussed above).

Accordingly, the digital asset activation system 700 enables a portable electronic device to be purchased either online or at a retail store. When the portable electronic device 718 has been purchased from the retail store 714, the retail store 714 (or the POS device 716) can operate to provide activation information to the activation server 704. Thereafter, when the portable electronic device 718 is connected to the host computer 708, the host computer 708 can operate to send device information (e.g., device identifier) to the activation server 704. The activation server 704 can then determine (based on activation information and device information) whether a digital gift is to be activated. When a digital gift is to be activated, the activation server 704 sends activation instructions to the host computer 708. Accordingly, the host computer 708 can interact with the portable electronic device 718 in accordance with the activation instructions to place the digital gift on the portable electronic device 718.

A resulting portable electronic device 720 is illustrated in FIG. 7 as having a digital gift 722 stored therein. The digital gift 722 can be utilized at one or more participating merchants to purchase digital assets that are to be provided to the portable electronic device 720. In one embodiment, any digital assets purchased using the digital gift can be restricted for use on the portable electronic device.

In another embodiment, a digital gift associated with a portable electronic device can be provided more directly by the order fulfillment center 710 or the retail store 714. For example, the order fulfillment center 710 can operate to associated a digital gift on the portable electronic device. As another example, the retail store 714 can also directly activate a digital gift. For example, the POS device 716, can directly interact with the portable electronic device to activate a digital gift. In one instance, a portable electronic device being purchased at the retail store 714 can be coupled to the POS device 716 in a wired (e.g., cable or dock) or wireless (e.g., RFID or Bluetooth) manner. The POS device 716 can then operate to activate a digital gift on the portable electronic device being purchased.

Figure 8:
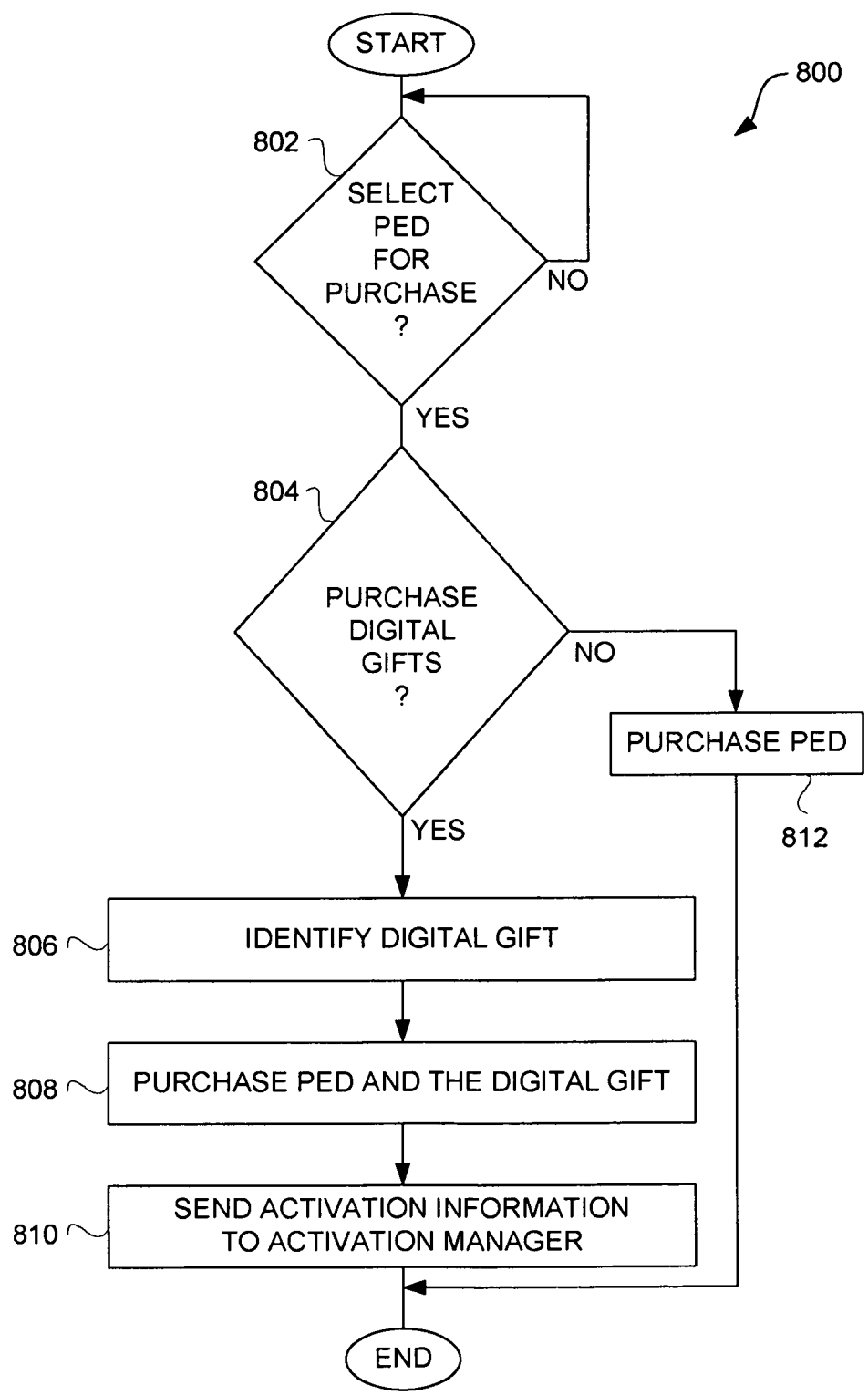
FIG. 8 is a flow diagram of a digital gift process according to one embodiment of the invention.

FIG. 8 is a flow diagram of a digital gift process 800 according to one embodiment of the invention. The digital gift process 800 can, for example, be performed by an online commerce system, an order fulfillment server, or a physical retail location.

The digital gift process 800 can begin with a decision 802 that determines whether a portable electronic device for purchase has been selected. Here, a purchaser can select a particular portable electronic device for purchase. When the decision 802 determines that a portable electronic device for purchase has not been selected, the digital gift process 800 can await such a selection. In one embodiment, the digital gift process 800 can be deemed invoked when a portable electronic device for purchase is selected.

Once the decision 802 determines that a portable electronic device for purchase has been selected, a decision 804 can determine whether a digital gift is to be purchased. In one embodiment, the digital gift that can be purchased is associated with the portable electronic device being purchased. In other words, the digital gift is typically provided for the portable electronic device. As one example, the digital gift can be for use on the portable electronic device. As another example, the digital gift can be initially associated with the portable electronic device and then subsequently (alternatively or additionally) associated with another electronic device.

When the decision 804 determines that a digital gift is to be purchased, a digital gift can be identified 806. In one implementation, the purchaser of the portable electronic device also identifies 806 the digital gift to be purchased. After the digital gift has been identified 806, the portable electronic device and the digital gift can be purchased 808. As an example, the portable electronic device and the digital gift can be purchased 808 by an e-commerce transaction initiated online or by a point-of-sale transaction at a retail store.

After the portable electronic device and the digital gift have been purchased 808, activation information can be sent 810 to the activation manager. The activation information can identify the particular portable electronic device that has been purchased as well as the particular digital gift that has been purchased. Thereafter, the activation manager can support activation of the digital gift on the particular portable electronic device. Following the block 810, the digital gift process 800 can end.

On the other hand, when the decision 804 determines that a digital gift is not being purchased, the portable electronic device can be purchased 812. Here, the portable electronic device is purchased but there is no digital gift being purchased. Following the block 812, the digital gift process 800 can end.

In one embodiment, a digital gift can be affiliated with a particular portable electronic device. In one implementation, the digital gift is usable only for acquiring digital assets that are to be provided to the particular portable electronic device that is affiliated thereto. In another embodiment, a digital gift can be usable by any user or any electronic device. In still another embodiment, a digital gift can be associated to a user account, such as a user account of an online store. In one implementation, where the digital gift is initially affiliated with a particular portable electronic device, the digital gift can be moved (i.e., transferred) to a user account. Such a user account is affiliated with a user and thus no longer affiliated to the particular portable electric device. For example, if the digital gift is for $20 USD, then a user's account can be credited with $20 USD, which can be used to purchase digital assets from an online store.

The portable electronic device utilized herein can, for example, correspond to a portable computing device (e.g., personal computer), mobile phone (e.g., cellular phone), personal digital assistant (PDA), digital media player (e.g., music, videos, games, images), media storage device, camera, remote control, and/or the like. The electronic device may also be a multi-functional device that combine two or more of these device functionalities into a single device. Examples of multi-functional devices can be found in U.S. Patent Application Publication No. 20060197753, entitled "MULTI-FUNCTIONAL HAND-HELD DEVICE", which is herein incorporated by reference.

The portable electronic device utilized herein can further be a hand-held electronic device. The term hand-held generally means that the electronic device has a form factor that is small enough to be comfortably held in one hand. A hand-held electronic device may be directed at one-handed operation or two-handed operation. In one-handed operation, a single hand is used to both support the device as well as to perform operations with the user interface during use. In two-handed operation, one hand is used to support the device while the other hand performs operations with a user interface during use or alternatively both hands support the device as well as perform operations during use. In some cases, the hand-held electronic device is sized for placement into a pocket of the user. By being pocket-sized, the user does not have to directly carry the device and therefore the device can be taken almost anywhere the user travels (e.g., the user is not limited by carrying a large, bulky and often heavy device).

Figure 9:
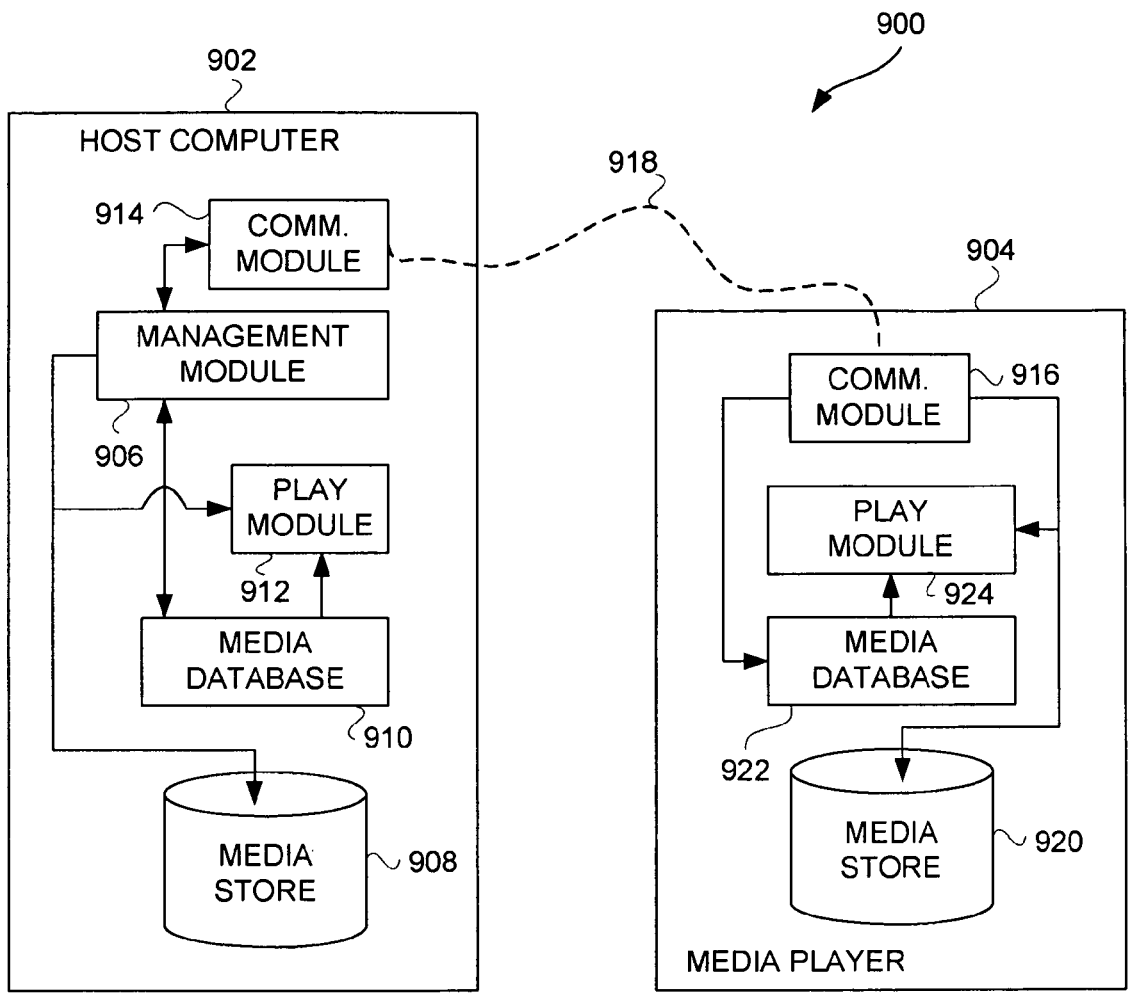
FIG. 9 is a block diagram of a media management system according to one embodiment of the invention.

FIG. 9 is a block diagram of a media management system 900 according to one embodiment of the invention. The media management system 900 includes a host computer 902 and a media player 904. As an example, the host computer 902 can represent the host computer 108 illustrated in FIG. 1 or the host computer 708 illustrated in FIG. 7. As an example, the media player 904 can represent the portable electronic device illustrated in FIGS. 1 and 7. The host computer 902 is typically a personal computer. The host computer, among other conventional components, can include a management module 906 which is a software module. The management module 906 provides for centralized management of media items (and/or playlists) not only on the host computer 902 but also on the media player 904. More particularly, the management module 906 manages those media items stored in a media storage device 908 associated with the host computer 902. The management module 906 also interacts with a media database 910 to store media information associated with the media items stored in the media storage device 908. In managing the media items at the host computer 902, the management module 906 can perform transfer and/or synchronization of media items.

The media information pertains to characteristics or attributes of the media items. For example, in the case of audio or audiovisual media, the media information can include one or more of: title, album, track, artist, show, series, actors, directors, producers, composer and genre. These types of media information are specific to particular media items. In addition, the media information can pertain to quality characteristics of the media items. Examples of quality characteristics of media items can include one or more of: bit rate, sample rate, resolution, equalizer setting, volume adjustment, start/stop and total time.

Still further, the host computer 902 includes a play module 912. The play module 912 is a software module that can be utilized to play certain media items stored in the media storage device 908. The play module 912 can also display (on a display screen) or otherwise utilize media information from the media database 910. Typically, the media information of interest corresponds to the media items to be played by the play module 912.

The host computer 902 also includes a communication module 914 that couples to a corresponding communication module 916 within the media player 904. A connection or link 918 removably couples the communication modules 914 and 916. In one embodiment, the connection or link 918 is a cable that provides a data bus, such as a FIREWIRE™ bus or USB bus. In another embodiment, the connection or link 918 is a wireless channel or connection through a wireless network.

Hence, depending on implementation, the communication modules 914 and 916 may communicate in a wired or wireless manner.

The media player 904 also includes a media store 920 that stores media items within the media player 904. Optionally, the media store 920 can also store data, i.e., non-media item storage. The media items being stored to the media store 920 are typically received over the connection or link 918 from the host computer 902. More particularly, the management module 906 sends all or certain of those media items residing on the media storage device 908 over the connection or link 918 to the media store 920 within the media player 904. Additionally, the corresponding media information for the media items that is also delivered to the media player 904 from the host computer 902 can be stored in a media database 922. In this regard, certain media information from the media database 910 within the host computer 902 can be sent to the media database 922 within the media player 904 over the connection or link 918. Still further, playlists identifying certain of the media items can also be sent by the management module 906 over the connection or link 918 to the media store 920 or the media database 922 within the media player 904.

Furthermore, the media player 904 includes a play module 924 that couples to the media store 920 and the media database 922. The play module 924 is a software module that can be utilized to play certain media items stored in the media store 920. The play module 924 can also display (on a display screen) or otherwise utilize media information from the media database 922. Typically, the media information of interest corresponds to the media items to be played by the play module 924.

Hence, in one embodiment, the media player 904 has limited or no capability to manage media items on the media player 904. However, the management module 906 within the host computer 902 can indirectly manage the media items residing on the media player 904. For example, to "add" a media item to the media player 904, the management module 906 serves to identify the media item to be added to the media player 904 from the media storage device 908 and then causes the identified media item to be delivered to the media player 904. As another example, to "delete" a media item from the media player 904, the management module 906 serves to identify the media item to be deleted from the media storage device 908 and then causes the identified media item to be deleted from the media player 904. As still another example, if changes (i.e., alterations) to characteristics of a media item were made at the host computer 902 using the management module 906, then such characteristics can also be carried over to the corresponding media item on the media player 904. In one implementation, the additions, deletions and/or changes occur in a batch-like process during synchronization of the media items on the media player 904 with the media items on the host computer 902.

In another embodiment, the media player 904 has limited or no capability to manage playlists on the media player 904. However, the management module 906 within the host computer 902 through management of the playlists residing on the host computer can indirectly manage the playlists residing on the media player 904. In this regard, additions, deletions or changes to playlists can be performed on the host computer 902 and then be carried over to the media player 904 when delivered thereto.

Synchronization is a form of media management. The ability to automatically initiate synchronization was also previously discussed above and in the related application noted above. Still further, however, the synchronization between devices can be restricted so as to prevent automatic synchronization when the host computer and media player do not recognize one another. In one implementation, the host computer can utilize an application resident on the host computer to permit utilization and provide management for media items, including transfer and/or synchronization of media items.

According to one embodiment, when a media player is first connected to a host computer (or even more generally when matching identifiers are not present), the user of the media player is queried as to whether the user desires to affiliate, associate, assign or lock the media player to the host computer. When the user of the media player elects to affiliate, assign or lock the media player with the host computer, then a pseudo-random identifier is obtained and stored in either the media database or a file within both the host computer and the media player. In one implementation, the identifier is an identifier associated with (e.g., known or generated by) the host computer or its management module and such identifier is sent to and stored in the media player. In another implementation, the identifier is associated with (e.g., known or generated by) the media player and is sent to and stored in a file or media database of the host computer.

Figure 10:
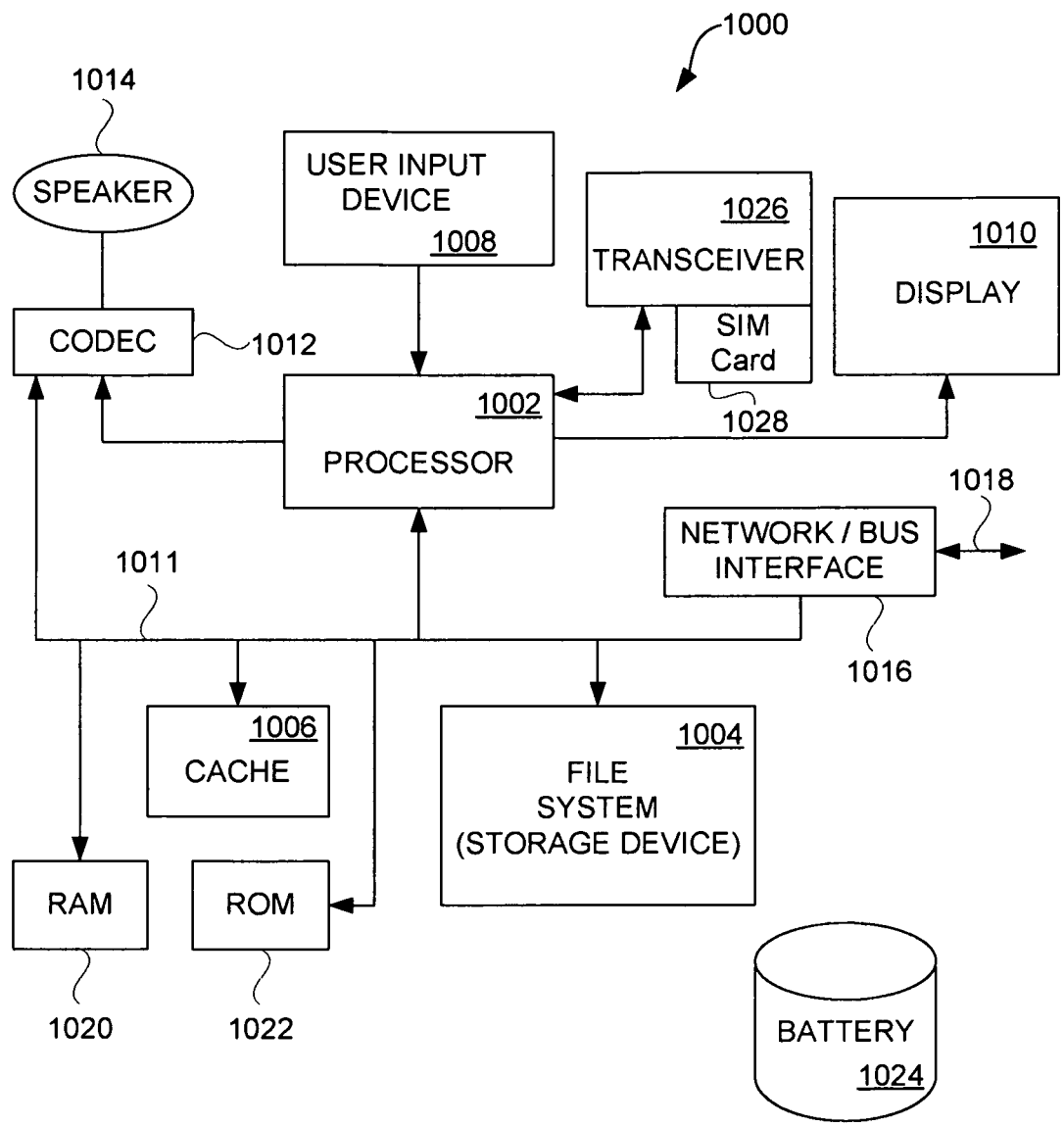
FIG. 10 is a block diagram of a mobile multi-function device according to one embodiment of the invention.

FIG. 10 is a block diagram of a mobile multi-function device 1000 according to one embodiment of the invention. The mobile multi-function device 1000 can include the circuitry of a portable electronic device that can perform the operations described above. The mobile multi-function device 1000 includes hardware and software components to provide at least two functions, namely, a media playback function (including display screen/menu presentations) and a wireless voice communications function. When providing media playback, the mobile multi-function device 1000 can operate as a media player capable of playing (including displaying) media items. The media items can, for example, pertain to audio items (e.g., audio files or songs), videos (e.g., movies) or images (e.g., photos). When providing wireless voice communications, the mobile multi-function device 1000 can operate as a mobile telephone (e.g., cellular phone).

The mobile multi-function device 1000 includes a processor 1002 that pertains to a microprocessor or controller for controlling the overall operation of the mobile multi-function device 1000. The mobile multi-function device 1000 stores media data pertaining to media items in a file system 1004 and a cache 1006. In one embodiment, the file system 1004 is implemented by a storage disk or a plurality of disks. In another embodiment, the file system 1004 is implemented by EEPROM or Flash type memory. The file system 1004 typically provides high capacity storage capability for the mobile multi-function device 1000. However, because the access time to the file system 1004 can be relatively slow, the mobile multi-function device 1000 can also include a cache 1006. The cache 1006 is, for example, Random-Access Memory (RAM) provided by semiconductor memory. The relative access time to the cache 1006 is substantially shorter than for the file system 1004. However, the cache 1006 does not have the large storage capacity of the file system 1004. Further, the file system 1004, when active, consumes more power than does the cache 1006. The power consumption is often a concern when the mobile multi-function device 1000 is a portable mobile multi-function device that is powered by a battery 1024. The mobile multi-function device 1000 also includes a RAM 1020 and a Read-Only Memory (ROM) 1022. The ROM 1022 can store programs, utilities or processes to be executed in a non-volatile manner. The ROM 1022 can be implemented by an EEPROM or Flash type memory so as to provide writable non-volatile data storage. The RAM 1020 provides volatile data storage, such as for the cache 1006.

In one embodiment, to support wireless voice communications, the mobile multi-function device 1000 includes a transceiver 1026 and a SIM card 1028. The transceiver 1026 supports wireless communication with a wireless network (such as a wireless cellular network). The SIM card 1028 includes an identifier (e.g., SIM identifier) can be used by the mobile multi-function device 1000 to gain access and utilize the wireless network. In other embodiments, a SIM card 1028 is not utilized.

The mobile multi-function device 1000 also includes a user input device 1008 that allows a user of the mobile multi-function device 1000 to interact with the mobile multi-function device 1000. For example, the user input device 1008 can take a variety of forms, such as a button, keypad, dial, etc. Still further, the mobile multi-function device 1000 includes a display 1010 (screen display) that can be controlled by the processor 1002 to display information to the user. A data bus 1011 can facilitate data transfer between at least the file system 1004, the cache 1006, the processor 1002, and the CODEC 1012.

In one embodiment, the mobile multi-function device 1000 serves to store a plurality of media items (e.g., songs) in the file system 1004. When a user desires to have the mobile multi-function device play a particular media item, a list of available media items is displayed on the display 1010. Then, using the user input device 1008, a user can select one of the available media items. The processor 1002, upon receiving a selection of a particular media item, supplies the media data (e.g., audio file) for the particular media item to a coder/decoder (CODEC) 1012. The CODEC 1012 then produces analog output signals for a speaker 1014. The speaker 1014 can be a speaker internal to the mobile multi-function device 1000 or external to the mobile multi-function device 1000. For example, headphones or earphones that connect to the mobile multi-function device 1000 would be considered an external speaker.

The mobile multi-function device 1000 also includes a bus interface 1016 that couples to a data link 1018. The data link 1018 allows the mobile multi-function device 1000 to couple to a host device (e.g., host computer or power source). The data link 1018 can also provide power to the mobile multi-function device 1000.

Still further, the mobile multi-function device 1030 can include a location determining module 1030. The location determining module 1030 can determine or assist in determining the location of the mobile multi-function device 1000. As one example, the location determining module 1030 can include at least a global positioning system (GPS) receiver. In another embodiment, the location determining module 1030 can include wireless communication circuitry to determine or assist in the determination of the location of the mobile multi-function device 1000. For example, the location determining module 1030 can use or incorporate some or all of the transceiver 1026.

The digital media assets (i.e., digital media items) can pertain to video items (e.g., video files or movies), audio items (e.g., audio files or audio tracks, such as for songs (music), podcasts or audiobooks), or image items (e.g., photos). The digital media assets can also include or be supplemented by text or multimedia files.

Addition information concerning synchronization can, for example, be found in the following applications. U.S. Patent Publication No. 2003/0167318 A1 is hereby incorporated by reference herein. U.S. Patent Publication No. 2003/0079038 A1 is hereby incorporated by reference herein. U.S. Patent Publication No. 2006/0168351 A1 is hereby incorporated by reference herein. U.S. Patent Publication No. 2006/0100978 A1 is hereby incorporated by reference herein. U.S. Patent Publication No. 2006/0156239 A1 is hereby incorporated by reference herein. U.S. application Ser. No. 11/324,863, filed Jan. 3, 2006, and entitled "REMOTE CONTENT UPDATES FOR PORTABLE MEDIA," is hereby incorporated herein by reference.

The various aspects, features, embodiments or implementations of the invention described above can be used alone or in various combinations.

The invention is preferably implemented by software, hardware, or a combination of hardware and software. The invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The advantages of the invention are numerous. Different aspects, embodiments or implementations may, but need not, yield one or more of the following advantages. One advantage of the invention is that digital assets can be pre-stored on a portable electronic device and then those of the pre-stored assets that are purchased can be activated. By pre-storing digital assets, digital assets can be rapidly made usable on portable electronic device without having to transmit digital data over a network. Another advantage of the invention is that purchasers are able to personalize electronic devices with personal digital messages that can be stored to the electronic devices. Still another advantage of the invention is that digital gifts can be purchased for use with portable electronic devices.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

The invention claimed is:

1. A method for activating digital assets pre-stored on a portable electronic device, the method comprising:
   receiving an indication of two or more digital assets pre-stored on a portable electronic device that are to be purchased, where the two or more digital assets are in a locked state and are unusable on the portable device;
   receiving a selection to unlock two or more of the two or more digital assets pre-stored on the portable electronic device;
   processing a purchase of the portable electronic device and the selected two or more pre-stored digital assets;
   initiating transmission of activation information of the selected two or more pre-stored digital assets to a remote activation manager, where the activation information includes asset identifiers for the selected two or more pre-stored digital assets; and
   receiving an activation code, where the activation code unlocks the selected two or more digital assets pre-stored on the portable electronic device so that the selected two or more digital assets are usable in an unlocked state without the need of using the activation code for subsequent uses on the portable electronic device.

2. The method of claim 1, wherein the activation information comprises a device identifier for the portable electronic device.

3. The method of claim 1, wherein the method is performed by an online store from which the portable electronic device and the two or more pre-stored digital assets are being purchased.

4. The method of claim 1, wherein the method is performed at a retail location offering the portable electronic device and the two or more pre-stored digital assets for purchase.

5. The method of claim 1, wherein the two or more pre-stored digital assets being purchased are digital media assets that can be presented by the portable electronic device after being purchased.

6. The method of claim 1, wherein the method further comprises:
   receiving a personalization message for the portable electronic device;
   storing the personalization message to defer delivery of the personalization message until the purchase of the portable electronic device; and
   delivering the personalization message to the portable electronic after the processing of the purchase of the portable electronic device.

7. The method of claim 6, wherein the personalization message being received was formed by entering text and/or by recording an audio and/or video message.

8. A digital asset purchase and activation system for portable electronic devices, comprising:
   a store configured to operatively connect to a network, the store offering for purchase (i) portable electronic devices having two or more pre-stored inactive digital assets stored thereon, and (ii) the two or more pre-stored inactive digital assets stored on the portable electronic devices;
   where the store is further configured to receive a selection of two or more of the two or more pre-stored inactive digital assets; and
   an activation manager configured to operatively connect to the network, the activation manager configured to (i) manage activation of certain pre-stored digital assets that have been purchased; (ii) receive activation information for a received selection of two or more of the two or more pre-stored inactive digital assets; (iii) receive a portable electronic device information; (iv) determine whether to provide an activation code based on the received activation information and the portable electronic device information; and (v) based on the determination transmit the activation code to activate the selected two or more of the two or more pre-stored inactive digital assets.

9. The digital asset purchase and activation system of claim 8, wherein the store is configured to (i) receive an indication of two or more digital assets pre-stored on a portable electronic device that are to be purchased, (ii) process the purchase of the portable electronic device and the two or more pre-stored digital assets; and (iii) initiate transmission of activation information to the activation manager.

10. The digital asset purchase and activation system of claim 8, wherein the store is an online store.

11. The digital asset purchase and activation system of claim 8, wherein the store is a retail store.

12. A method for activating a digital asset pre-stored on a portable electronic device, the method comprising:

retrieving a device identifier from the portable electronic device by a host computer, where the act of retrieving is performed while the portable electronic device is connected to the host computer;
sending the device identifier to a remote activation manager;
determining whether an activation code is received by the host computer from the remote activation manager in response to the sending of the device identifier to the remote activation manager, the activation manager configured to activate the two or more inactive digital assets pre-stored on the portable electronic device; and
activating the two or more inactive digital assets that are pre-stored on the portable electronic device in accordance with the received activation code;
wherein the activation code is at least configured to allow the activated two or more inactive digital assets to be useable without the need of using the activation code for later uses.

13. The method of claim 12, wherein the two or more digital assets comprise two or more digital media assets.

14. A method for activating one or more digital assets pre-stored on a first client device, the method comprising:
   receiving identifiers of one or more pre-stored digital assets in an unusable form on the first client device;
   receiving a device identifier for the first client device;
   sending the identifiers of the one or more pre-stored digital assets and the device identifier to a network device;
   receiving from the network device an activation code;
   determining whether the activation code received from the network device is based on the sent identifiers and the device identifier; and
   based on the determination, either activating the one or more pre-stored digital assets or de-activating the one or more pre-stored digital assets on the first client device.

15. The method of claim 14, further comprising:
   receiving a personalization message for the first client device; and
   delivering the personalization message to the first client device when the one or more pre-stored digital assets has been activated.

16. The method of claim 14, further comprising determining whether the first client device is connected to a second client device.

17. The method of claim 16, further comprising based on the determination, identifying whether the first client device has the one or more pre-stored digital assets stored on the first client device.

18. The method of claim 17, further comprising based on the identification, requesting identifiers for the one or more pre-stored digital assets stored on the first client device.

19. An apparatus for activating one or more digital assets pre-stored on a client device, the apparatus comprising:
   a storage apparatus;
   at least one interface configured to communicate with a network device;
   at least one processor, the processor configured to run at least one computer program thereon, the computer program stored at the storage apparatus and comprising a plurality of instructions which are configured to, when executed, cause the apparatus to:
     determine whether a client device is connected;
     receive a unique client device identifier for one or more pre-stored digital assets in an unusable form on the client device;
     transmit the unique client device identifier for the one or more pre-stored digital assets to the network device, the unique client device identifier comprising at least digital asset identifiers for the one or more pre-stored digital assets and the client device;

receive from the network device an activation code;

determine whether the activation code received from the network device is based on the sent unique client identifier; and based on the determination, either activate or de-activate the one or more pre-stored digital assets on the client device;

wherein the activation of the one or more pre-stored digital assets on the client device allows the one or more pre-stored digital assets to be used for following uses without a use of the activation code.

\* \* \* \* \*